United States Patent [19]

Bonner et al.

[11] Patent Number: 5,302,213

[45] Date of Patent: * Apr. 12, 1994

[54] HEAT TREATING ATMOSPHERES FROM NON-CRYOGENICALLY GENERATED NITROGEN

[75] Inventors: Brian B. Bonner, Nesquehoning; Diwakar Garg, Macungie, both of Pa.

[73] Assignee: Air Products and Chemicals, Inc., Allentown, Pa.

[*] Notice: The portion of the term of this patent subsequent to Jun. 22, 2010 has been disclaimed.

[21] Appl. No.: 995,623

[22] Filed: Dec. 22, 1992

[51] Int. Cl.$^5$ .............................................. C21D 1/00
[52] U.S. Cl. .................................... 148/208; 148/206
[58] Field of Search ................................ 148/206, 208

[56] References Cited

U.S. PATENT DOCUMENTS 5,207,839  5/1993  Claverie et al. ..................... 148/208

Primary Examiner—Upendra Roy
Attorney, Agent, or Firm—James C. Simmons; William F. Marsh

[57] ABSTRACT

An improved process for producing nitrogen-based atmospheres suitable for annealing ferrous metals and alloys, brazing metals, sintering metal and ceramic powders, and sealing glass to metals from non-cryogenically generated nitrogen is presented. These atmospheres are produced by 1) humidifying non-cryogenically generated nitrogen containing less than 5.0 vol. % residual oxygen, 2) mixing it with a specified amount of a hydrocarbon gas, 3) feeding the gaseous mixture into the heating zone of a furnace through a diffuser, and 4) converting in-situ the residual oxygen and moisture present in it to a mixture of carbon dioxide, carbon monoxide, moisture, and/or hydrogen. The key features of the present invention include a) humidifying the feed gas prior to introducing it into the heating zone of a furnace operated above about 800° C. and b) using enough amount of a hydrocarbon gas to facilitate in-situ conversion of residual oxygen and moisture present in the feed gas to a mixture of carbon dioxide, carbon monoxide, moisture, and hydrogen in the heating zone of a furnace.

8 Claims, 3 Drawing Sheets

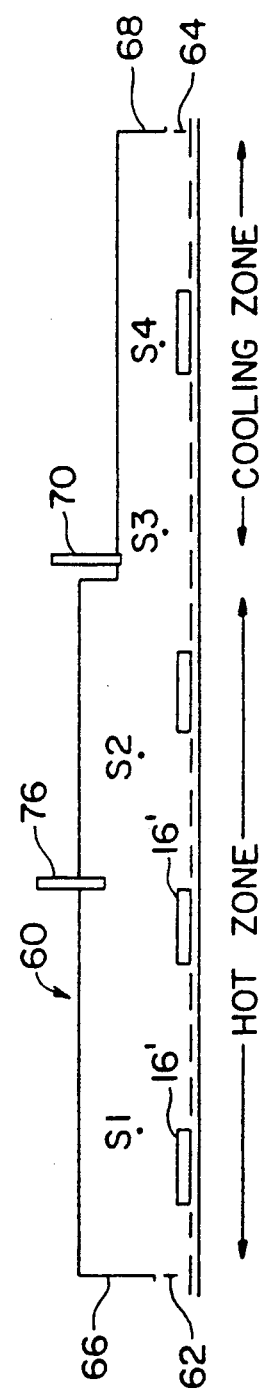

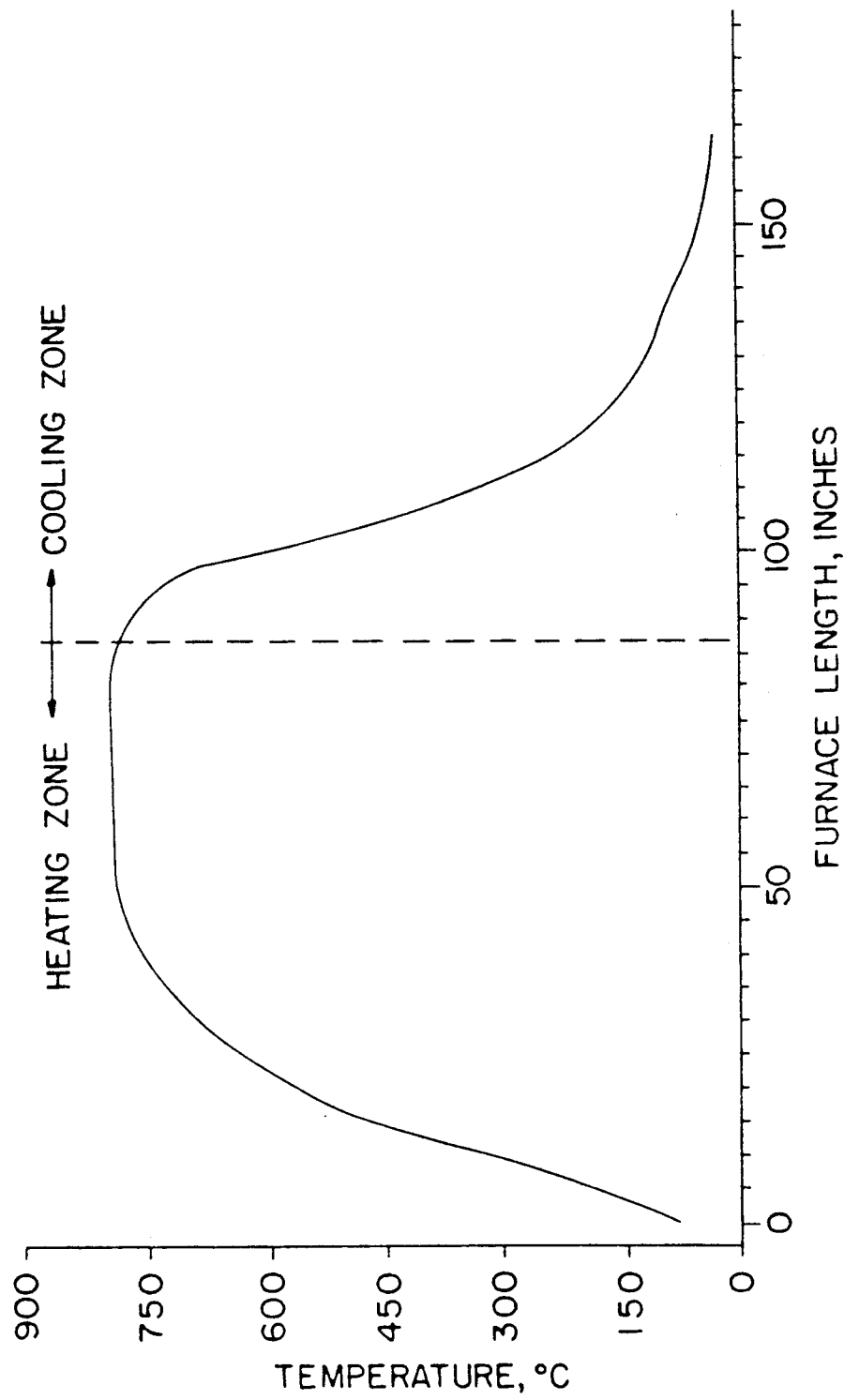

HEAT TREATING ATMOSPHERES FROM NON-CRYOGENICALLY GENERATED NITROGEN

FIELD OF THE INVENTION

The present invention discloses an improved process for producing atmospheres suitable for annealing ferrous metals and alloys, brazing metals, sintering metal and ceramic powders, and sealing glass to metals from noncryogenically generated nitrogen.

BACKGROUND OF INVENTION

U.S. Patent application Ser. No. 07/727,806, filed Jul. 8, 1992 now. U.S. Pat. No. 5,221,369 discloses a process for producing in-situ heat treating atmospheres from non-cryogenically generated nitrogen. According to the application, suitable atmospheres are produced by 1) mixing noncryogenically generated nitrogen containing up to 5 vol. % residual oxygen with a hydrocarbon gas, 2) feeding the gaseous mixture into the heating zone of a furnace through a diffuser, and 3) converting the residual oxygen to an acceptable form such as a mixture of moisture and carbon dioxide, a mixture of moisture, hydrogen, carbon monoxide, and carbon dioxide, or a mixture of carbon monoxide, moisture, and hydrogen. The flow rate of a hydrocarbon gas is controlled in such way that it is always greater than the stoichiometric amount required for the complete conversion of residual oxygen to a mixture of moisture and carbon dioxide.

According to the application, acceptable atmospheres for oxide and bright annealing carbon steels are produced by carefully selecting the furnace temperature and amounts of residual oxygen and hydrocarbon gas employed. The operating regions for oxide and bright annealing claimed in this patent application are noted to be narrow. For example, an atmosphere acceptable for bright annealing carbon steels is produced at 950° C. with the use of natural gas when the amount of residual oxygen present in the feed gas is limited to 0.1 vol. % or less. It is therefore desirable to 1) develop processes for using non-cryogenically generated nitrogen containing more than 0.1% residual oxygen at 950° C. for producing atmosphere suitable for bright annealing carbon steels and 2) expand operating regions for oxide and bright annealing carbon steels.

SUMMARY OF THE INVENTION

The present invention pertains to a process for producing nitrogen-based atmospheres suitable for annealing ferrous metals and alloys, brazing metals, sintering metal and ceramic powders, and sealing glass to metals from non-cryogenically generated nitrogen. According to the process of the present invention, these nitrogen-based atmospheres are produced by 1) humidifying non-cryogenically generated nitrogen containing less than 5.0 vol. % residual oxygen, 2) mixing it with a specified amount of a hydrocarbon gas, 3) feeding the gaseous mixture into the heating zone of a furnace in a defined manner, and 4) converting in-situ the residual oxygen and moisture present in it to a mixture of carbon dioxide, carbon monoxide, moisture, and hydrogen. The process of present invention unexpectedly increases the amount of residual oxygen that can be used for producing atmospheres suitable for bright annealing carbon steels at low temperatures. It also unexpectedly expands operating regions for oxide and bright annealing carbon steels.

The key features of the present invention include a) humidification of non-cryogenically generated nitrogen prior to introducing it into the heating zone of a furnace operated above about 800° C. and b) selection of residual oxygen, moisture, and a hydrocarbon gas levels in the feed gas in such a way that they produce in-situ atmospheres suitable for annealing ferrous metals and alloys, brazing metals, sintering metal and ceramic powders, and sealing glass to metals.

BRIEF DESCRIPTION OF THE DRAWINGS

FIG. 1 is a schematic representation of a furnace used to test the heat treating process according to the present invention.

FIG. 2A is a plot of temperature against length of the furnace illustrating the experimental furnace profile for a heat treating temperature of 750° C.

DETAILED DESCRIPTION OF THE INVENTION

Figure 2B:
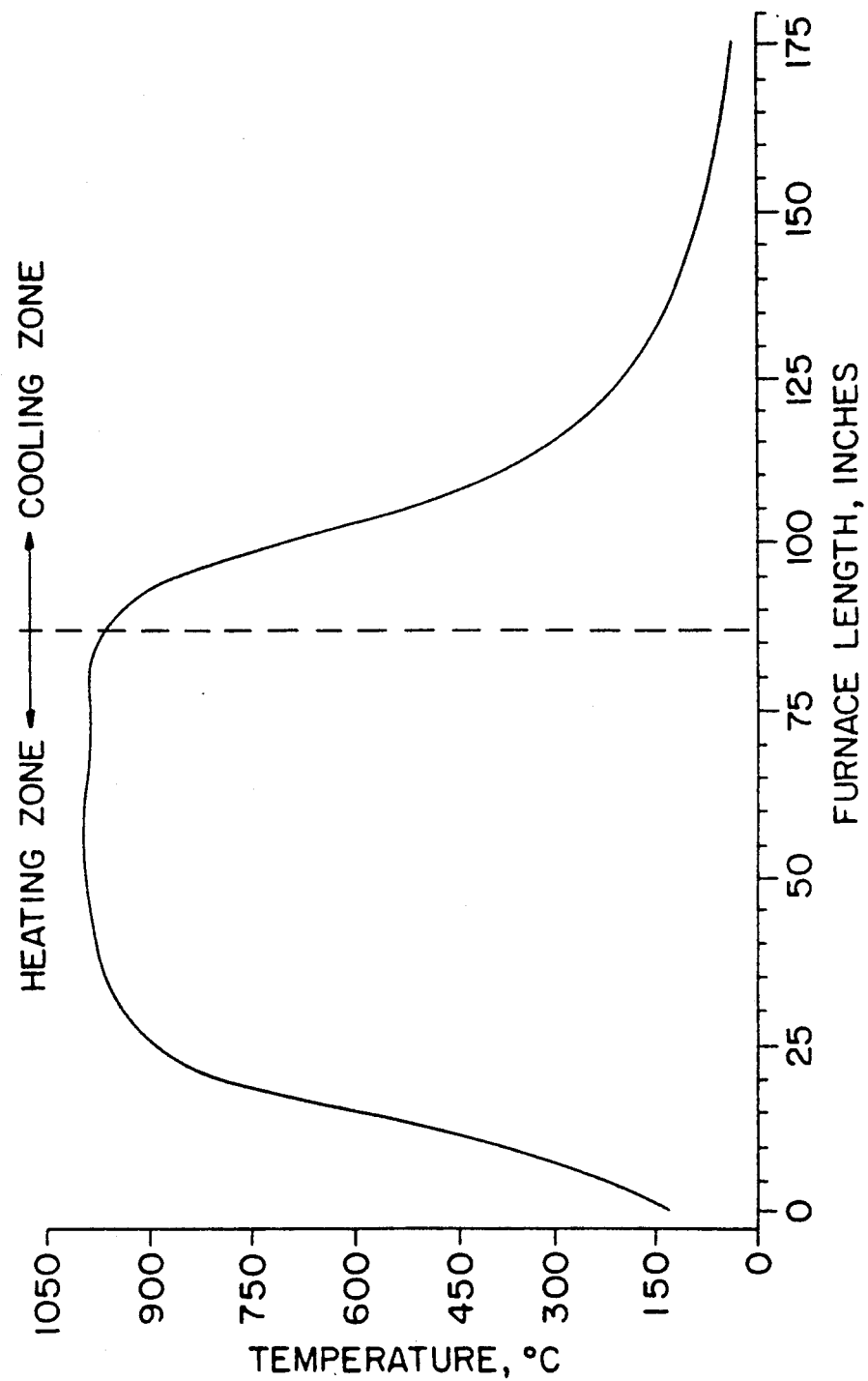
FIG. 2B is a plot similar to that of FIG. 2A for a heat treating temperature of 950° C.

Nitrogen gas produced by cryogenic distillation of air has been widely employed in many heat treating applications. It is substantially free of oxygen (oxygen content has generally been less than 10 ppm) and expensive. Therefore, there has been a great demand, especially by the heat treating industry, to generate nitrogen safely and inexpensively for heat treating applications. With the advent of non-cryogenic technologies for air separation such as adsorption and permeation, it is now possible to produce nitrogen gas safely and inexpensively. The non-cryogenically produced nitrogen, however, is contaminated with up to 5% residual oxygen, which is generally undesirable for many heat treating applications. The presence of residual oxygen has made the direct substitution of cryogenically produced nitrogen with that produced by non-cryogenic techniques very difficult.

According to the present invention, suitable atmospheres are produced by 1) humidifying non-cryogenically generated nitrogen containing less than 5.0 vol. % residual oxygen, 2) mixing it with a specified amount of a hydrocarbon gas, 3) feeding the gaseous mixture into the heating zone of a furnace operated above about 800° C. through a diffuser, and 4) converting in-situ the residual oxygen and moisture present in it to a mixture of carbon dioxide, carbon monoxide, moisture, and hydrogen. The function of adding a hydrocarbon gas is to convert residual oxygen and added moisture to a mixture of carbon monoxide, carbon dioxide, moisture, and hydrogen. Alternatively the hydrocarbon gas can be mixed with the nitrogen before humidification, or mixing and humidification can take place simultaneously.

The residual oxygen in non-cryogenically produced nitrogen for the process of the present invention can vary from 0.05% to less than about 5.0 vol. %, preferably from about 0.1% to about 3.0 vol. %, and ideally, from about 0.1%, to about 1.0 vol. %.

The hydrocarbon gas can be selected from alkanes such as methane, ethane, propane, and butane and alkenes such as ethylene, propylene, and butene. Commercial feedstocks such as natural gas, petroleum gas, cooking gas, coke oven gas, and town gas can also be used as a hydrocarbon gas. The amount of a hydrocarbon gas used is always more than a stoichiometric amount required for converting completely residual oxygen to a mixture of carbon dioxide and moisture. The amount of hydrocarbon gas used can vary from about stoichiometric amount to about 40 times the stoichiometric amount required for converting completely residual oxygen to a mixture of carbon dioxide and moisture. However, the selection of the amount of a hydrocarbon gas depends upon the treatment temperature and the composition and the reactivity of the hydrocarbon gas. For example, the amount of natural gas or methane required will always be more than the amount of propane required. This is due to the fact that propane is more reactive with oxygen than natural gas.

The amount of moisture added to the feed gas can vary from about 0.1 vol. % to about 5.0 vol. % preferably, from about 0.5 vol.? -. to about 2.0 vol. %. The moisture added to the gaseous feed mixture can alternatively be introduced in the heating zone of the furnace in the form of water vapors or steam. A part or all of added moisture can be replaced with known decarburizing gases such as carbon dioxide, nitrous oxide ($N_2O$), etc.

It is, however, important to adjust the hydrocarbon, residual oxygen, and moisture levels in the feed gas in such a way that the desired $pH_2/pH_2O$ and $pCO/pCO_2$ ratios are obtained in the heating and cooling zones of the furnace for bright and oxide annealing, brazing, and sintering operations.

According to the present invention, the residual oxygen is converted with a hydrocarbon gas to a mixture of carbon dioxide and moisture in the heating zone of a heat treating furnace by introducing the gaseous feed mixture through a device that prevents the direct impingement of feed gas on the parts. The mixture of carbon dioxide, moisture produced, and moisture added reacts with additional amount of a hydrocarbon gas in the heating zone of the furnace, producing a mixture of carbon monoxide, carbon dioxide, moisture, and hydrogen depending on the furnace temperature, amount of residual oxygen in the feed nitrogen, moisture added, and the amount of the hydrocarbon gas used.

The device used to introduce the mixture into the furnace can be any of the devices shown and described in U.S. Patent application Ser. No. 07/727,806, filed Jul. 8, 1991, the specification of which is incorporated herein by reference.

In addition to using devices disclosed in the aforementioned Application, a flow directing plate or a device facilitating mixing of hot gases present in the furnace with the feed gas can also be used.

The design and dimensions of the device will depend upon the size of the furnace, the operating temperature, and the total flow rate of the feed used during heat treatment. For example, the internal diameter of an open tube fitted with a baffle can vary from 0.25 in. to 5 in. The porosity and the pore size of porous sintered metal or ceramic end tubes can vary from 50% to 90% and from 5 microns to 1,000 microns, respectively. The length of porous sintered metal or ceramic end tube can vary from about 0.25 in. to about 5 feet. The porous sintered metal end tube can be made of a material selected from steel, stainless steel, Monel, Inconel, or any other high temperature resistant metal. The porous ceramic end tube can be made of alumina, zirconia, magnesia, titania, or any other thermally stable material. The diameter of metallic end tube with a plurality of holes can also vary from 0.25 in. to 5 in. depending upon the size of the furnace. The metallic end tube can be made of a material selected from stainless steel, Monel, Inconel, or any other high temperature resistant metal. Its length can vary from about 0.25 in. to about 5 feet. The size and the number of holes in this end tube can vary from 0.05 in. to 0.5 in. and from 2 to 10,000, respectively. Finally, more than one device can be used to introduce gaseous feed mixture in the hot zone of a continuous furnace depending upon the size of the furnace and the total flow rate of feed gas.

A furnace equipped with separate heating and cooling zones is most suitable for the process of the invention. It can be operated at atmospheric or above atmospheric pressure for the process of the invention. The furnace can be of the mesh belt, a roller hearth, a pusher tray, a walking beam, or a rotary hearth type. The furnace can optionally have the capability of introducing steam in the heating zone of the furnace. It can optionally be equipped with a nitrogen gas (containing less than 10 ppm oxygen) curtain at the end of the cooling zone (discharge end) to avoid infiltration of air from the outside through the discharge vestibule. Furthermore, a pure oxygen-free nitrogen stream such as the one produced by vaporizing liquid nitrogen can optionally be used in the cooling zone of the furnace.

A continuous furnace with a heating zone and an integrated quench cooling zone is also ideal for the present invention. It can be operated at atmospheric or above atmospheric pressure. The continuous furnace can be of the mesh belt, shaker, a roller hearth, a pusher tray, a shaker hearth, a rotary retort, or a rotary hearth type. The furnace can optionally have the capability of introducing steam in the heating zone of the furnace. A pure substantially oxygen-free nitrogen stream such as the one produced by vaporizing liquid nitrogen can optionally be used in the quench cooling zone of the furnace to prevent infiltration of air from the outside.

The operating temperature of the heat treating furnace can be selected from above about 800° C. to about 1,250° C.

Low to high carbon or alloy steels that can be heat treated according to the present invention can be selected from the groups 1OXX, 11XX, 12XX, 13XX, 15XX, 40XX, 41XX, 43XX, 44XX, 47XX, 48XX, 5OXX, 51XX, 61XX, 81XX, 86XX, 87XX, 88XX, 92XX, 92XX, 93XX, 50XXX, 51XXX, or 52XXX as described in Metals Handbook, Ninth Edition, Volume 4 Heat Treating, published by American Society for Metals. Tool steels selected from the groups AX, DX, HX, OX, MX, or SX, iron nickel based alloys such as Incoloy, nickel alloys such as Inconel and Hastalloy, nickel-copper alloys such as Monel, copper alloys, gold alloys, and cobalt based alloys such as Haynes and Stellite can be heat treated according to process disclosed in this invention.

The iron-based powders that can be sintered according to the present invention can be selected from Fe, Fe-C with up to 1% carbon, Fe-Cu-C with up to 20% copper and 1% carbon, Fe-Ni with up to 50% Ni, Fe-Mo-Mn-Cu-Ni-C with Lip tO 1% Mo, Mn, and carbon each and up to 2% Ni and Cu each, Fe-Cr-Mo-Co-Mn-V-W-C with varying concentrations of alloying elements depending on the final properties of the sintered product desired. Other elements such as B, Al, Si, P, S, etc. can optionally be added to the iron-based powders to obtain the desired properties in the final sintered product. These iron-based powders can be mixed with up to 2% zinc stearate to help in pressing parts.

According to the present invention, a nitrogen-based atmosphere required for oxide annealing carbon steels is produced from non-cryogenically generated nitrogen by 1) humidifying the feed gas, 2) adding less than four times the stoichiometric amount of natural gas required for converting residual oxygen to a mixture of carbon dioxide and moisture, 3) feeding the resultant gaseous mixture into the heating zone of a furnace operating above about 800° C. temperature through a diffuser, and 4) reacting the residual oxygen and moisture present in it with the natural gas to produce the desired $pH_2/pH_2O$ and $pCO/pCO_2$ ratios in the furnace.

According to an embodiment of the present invention, a nitrogen-based atmosphere required for bright annealing carbon steels is produced from non-cryogenically generated nitrogen by 1) humidifying the feed gas, 2) adding more than or equal to eight times the stoichiometric amount of natural gas required for converting residual oxygen to a mixture of carbon dioxide and moisture, 3) feeding the resultant gaseous mixture into the heating zone of a furnace operating above about 900° C. temperature through a diffuser, and 4) reacting the residual oxygen and moisture present in it with the natural gas to produce the desired $pH_2/pH_2O$ and $pCO/pCO_2$ ratios in the furnace.

According to another embodiment of the present invention, a nitrogen-based atmosphere required for brazing metals, sealing glass to metals, or sintering of metal and ceramic powders is produced from non-cryogenically generated nitrogen by 1) humidifying the feed gas, 2) adding more than or equal to eight times the stoichiometric amount of natural gas required for converting residual oxygen to a mixture of carbon dioxide and moisture, 3) feeding the resultant gaseous mixture into the heating zone of a furnace operating above about 900° C. temperature through a diffuser, and 4) reacting the residual oxygen and moisture present in it with the natural gas to produce the desired $pH_2/pH_2O$ and $pCO/pCO_2$ ratios in the furnace.

A Watkins-Johnson conveyor belt furnace capable of operating up to a temperature of 1,150° C. was used in all the laboratory heat treating experiments. The heating zone of the furnace consisted of 8.75 inches wide, about 4.9 inches high, and 86 inches long Inconel 601 muffle heated resistively from the outside. The cooling zone, made of stainless steel, was 8.75 inches wide, 3.5 inches high, and 90 inches long and was water cooled from the outside. A 8.25 inches wide flexible conveyor belt supported on the floor of the furnace was used to feed the samples to be heat treated through the heating and cooling zones of the furnace. A fixed belt speed of 6 inches per minute was used in all the experiments. The furnace shown schematically as 60 in FIG. 1 was equipped with physical curtains 62 and 64 both on entry 66 and exit 68 sections to prevent air from entering the furnace. The gaseous feed mixture was introduced into the heating zone through an introduction device selected from FIGS. 3A to 3F of U.S. Pat. No. 5,221,369 placed at location 76 in the heating zone of the furnace during heat treating experiments. The feeding area 76 was located in the heating zone 40 in. away from the cooling zone, as shown in FIG. 1. This feed area was located well into the hottest section of the heating zone as shown by the furnace temperature profiles depicted in FIGS. 2A and 2B obtained at 750°0 C. and 950° C. normal furnace operating temperature with 350 SCFH of pure nitrogen flowing into furnace 60. The temperature profiles show a rapid cooling of the parts as they move out of the heating zone and enter the cooling zone. Rapid cooling of the parts is commonly used by the heat treating industry to help in minimizing/preventing oxidation of the parts from high levels of moisture in the cooling zone.

In order to demonstrate the invention a series of annealing tests were carried out in the Watkins-Johnson conveyor belt furnace. An annealing temperature between 750° C. to 1,100° C. was selected and used for annealing 0.2 in. thick flat low-carbon steel (1010 carbon steel) specimens approximately 8 in. long by 2 in. wide. The results of these tests are presented below. The atmosphere composition present in the heating zone of the furnace was determined by taking samples at multiple locations, as shown in FIG. 1. Likewise, samples were taken at multiple locations in the cooling zone to determine atmosphere composition (see FIG. 1 for the location of sampling ports). The samples were analyzed for residual oxygen, moisture (dew point), hydrogen, methane, CO, and $CO_2$.

Table 1 and the following text set forth a series of control tests relevant to the invention.

TABLE 1

|  | Example 1A | Example 1B | Example 1C | Example 1D | Example 1E | Example 1F |
| --- | --- | --- | --- | --- | --- | --- |
| Type of Samples | Carbon Steel | Carbon Steel | Carbon Steel | Carbon Steel | Carbon Steel | Carbon Steel |
| Heat Treatment Temperature, °C. | 1,100 | 1,050 | 1,000 | 1,000 | 950 | 950 |
| Flow Rate of Feed Gas, SCFH | 350 | 350 | 350 | 350 | 350 | 350 |
| Feed Gas Location | Heating Zone | Heating Zone | Heating Zone | Heating Zone | Heating Zone | Heating Zone |
| Type of Feed Device | Modified Diffuser | Modified Diffuser | Modified Diffuser | Modified Diffuser | Modified Diffuser | Modified Diffuser |
| Feed Gas Composition |  |  |  |  |  |  |
| Nitrogen, % | 99.50 | 99.50 | 99.50 | 99.70 | 99.50 | 99.90 |
| Oxygen, % | 0.50 | 0.50 | 0.50 | 0.30 | 0.50 | 0.10 |
| Moisture*, % | 0.00 | 0.00 | 0.00 | 0.00 | 0.00 | 0.00 |
| Natural Gas*, % | 2.00 | 2.00 | 2.00 | 2.00 | 2.00 | 2.00 |
| Heating Zone Atmosphere Composition |  |  |  |  |  |  |
| Oxygen, ppm | <4 | <5 | >10 | <3 | >10 | <3 |
| Hydrogen, % | 2.50 | 2.40 | — | 1.20 | — | 0.80 |
| Moisture, ppm | 15 | 15 | — | 15 | — | 15 |
| Carbon Monoxide, % | 0.95 | 0.90 | — | 0.40 | — | 0.10 |
| Carbon Dioxide, % | 0.00 | 0.00 | — | 0.00 | — | 0.00 |
| Cooling Zone Atmosphere Composition |  |  |  |  |  |  |
| Oxygen, ppm | <7 | <6 | >10 | <9 | >10 | <9 |
| Hydrogen, % | 2.50 | 2.40 | — | 1.60 | — | 1.30 |
| Moisture, ppm | 310 | 300 | — | 20 | — | 15 |
| Carbon Monoxide, % | 0.90 | 0.85 | — | 0.40 | 00 | 0.15 |
| Carbon Dioxide, % | 0.00 | 0.00 | — | 0.00 | — | 0.00 |
| Quality of Heat Treated Samples | Uniform Bright | Uniform Bright | Bright with | Uniform | Bright with | Uniform Bright |

TABLE 1-continued

| Example 1A | Example 1B | Example 1C | Example 1D | Example 1E | Example 1F |
| --- | --- | --- | --- | --- | --- |
| | | Straw Color | Bright | Straw Color | |

*Moisture and natural gas were added as percent of feed noncryogenically generated nitrogen

CONTROL EXAMPLE 1A

Carbon steel samples described earlier were annealed at 1,100° C. in the Watkins-Johnson furnace using 350 SCFH flow of nitrogen containing 99.5% N2 and 0.5% O2. The gaseous feed nitrogen was similar in composition to that commonly produced by non-cryogenic air separation techniques. It was mixed with 2.0% natural gas consisting of predominately methane. This amount of natural gas was eight (8) times the stoichiometric amount required for the complete conversion of residual oxygen present in the feed nitrogen to a mixture of carbon dioxide and moisture. The gaseous feed mixture was introduced into the heating zone of the furnace (location 76 in FIG. 1) through a diffuser. A generally cylindrical shaped diffuser comprising a top half of $\frac{3}{4}$ in. diameter, 6 in. long porous Inconel material with a total of 96$\frac{1}{4}$ in. diameter holes was assembled. The size and number of holes in the diffuser were selected in a way that it provided uniform flow of gas through each hole. The bottom half of the diffuser was a gas impervious Inconel with one end of the diffuser capped and the other end attached to a $\frac{1}{2}$ in. diameter stainless steel feed tube inserted into the furnace 60 through the cooling end vestibule 68. The bottom half of the diffuser was positioned parallel to the parts 16' being treated thus essentially directing the flow of feed gas towards the hot ceiling of the furnace. The diffuser therefore helped in preventing the direct impingement of feed gas on the parts.

Steel samples heat treated in accord with this procedure were found to have uniformly bright surface finish. The residual oxygen present in the feed nitrogen was converted almost completely (less than 7 ppm) in the heating and cooling zones to a mixture of carbon monoxide and moisture. Additionally, a substantial amount of hydrogen was produced in the heating and cooling zones by the reaction of residual oxygen and natural gas, as shown in Table 1. The presence of substantial amounts of carbon monoxide and hydrogen or the presence of high pCO/pCO2 (>2.8) and pH2/pH20 (>1.3) ratios both in the heating and cooling zones resulted in reducing the surface of the samples.

Thus the introduction of non-cryogenically produced nitrogen pre-mixed with 8.0 times the stoichiometric amount of natural gas into a continuous heat treating furnace through a modified porous diffuser such as described above located in the heating zone (Location 76) would result in an acceptable process for bright annealing steel at 1,100 C.

CONTROL EXAMPLE 1B

The carbon steel annealing experiment described in Control Example 1A was repeated using similar furnace and flow rate of and composition of feed gas with the exception of using 1,050° C. temperature, as shown in Table 1. Steel samples heat treated in accord with this procedure were found to have uniformly bright surface finish. The residual oxygen present in the feed nitrogen was converted almost completely (less than 6 ppm) in the heating and cooling zones to a mixture of carbon monoxide and moisture. Additionally, a substantial amount of hydrogen was produced in the heating and cooling zones by the reaction of residual oxygen and natural gas, as shown in Table 1. The presence of substantial amounts of carbon monoxide and hydrogen or the presence of high pCO/pCO2 (>2.6) and pH2/pH20 (>1.4) ratios both in the heating and cooling zones resulted in reducing the surface of the samples.

CONTROL EXAMPLES 1C

The carbon steel annealing experiment described in Control Example 1A was repeated using similar furnace and flow rate of and composition of feed gas with the exception of using 1,000° C. temperature, as shown in Table 1. Steel samples heat treated in accord with this procedure were found to have mixture of bright and oxide surface finish probably due to incomplete conversion of residual oxygen with natural gas since the residual oxygen in the heating and cooling zones of the furnace was above 10 ppm, as shown in Table 1. This example therefore showed that carbon steel samples cannot be bright or oxide annealed with acceptable surface finish with non-cryogenically generated nitrogen containing 0.5% residual oxygen at 1,000° C. furnace temperature even with the addition of excess amount of natural gas.

CONTROL EXAMPLE 1D

The carbon steel annealing experiment described in Control Example 1C was repeated using similar furnace and flow rate of nitrogen and natural gas, and furnace temperature with the exception of using non-cryogenically generated nitrogen containing 99.7% nitrogen and 0.3% residual oxygen, as shown in Table 1. The amount of natural gas added was 13.33 times the stoichiometric amount required for the complete conversion of residual oxygen present in the feed nitrogen to a mixture of carbon dioxide and moisture. Steel samples heat treated in accord with this procedure were found to have uniformly bright surface finish. The residual oxygen present in the feed nitrogen was converted almost completely (less than 9 ppm) in the heating and cooling zones to a mixture of carbon monoxide and moisture. Additionally, a substantial amount of hydrogen was produced in the heating and cooling zones by the reaction of residual oxygen and natural gas, as shown in Table 1. The presence of substantial amounts of carbon monoxide and hydrogen or the presence of high pCO/pCO2 (>2.5) and pH2/pH20 (>1.5) ratios both in the heating and cooling zones resulted in reducing the surface of the samples.

CONTROL EXAMPLE 1E

The carbon steel annealing experiment described in Control Example 1C was repeated using similar furnace and flow rate of and composition of feed gas with the exception of using 950° C. temperature, as shown in Table 1. Steel samples heat treated in accord with this procedure were found to have mixture of bright and oxide surface finish probably due to incomplete conversion of residual oxygen with natural gas since the residual oxygen in the heating and cooling zones of the furnace was above 10 ppm, as shown in Table 1. This example therefore showed that carbon steel samples cannot be bright or oxide annealed with acceptable surface finish with non-cryogenically generated nitrogen containing 0.5% residual oxygen at 950° C. furnace temperature even with the addition of excess amount of natural gas.

CONTROL EXAMPLE 1F

The carbon steel annealing experiment described in Control Example 1E was repeated using similar furnace and flow rate of nitrogen and natural gas, and furnace temperature with the exception of using non-cryogenically generated nitrogen containing 99.9% nitrogen and 0.1% residual oxygen, as shown in Table 1. The amount of natural gas added was 40 times the stoichiometric amount required for the complete conversion of residual oxygen present in the feed nitrogen to a mixture of carbon dioxide and moisture. Steel samples heat treated in accord with this procedure were found to have uniformly bright surface finish. The residual oxygen present in the feed nitrogen was converted almost completely (less than 9 ppm) in the heating and cooling zones to a mixture of carbon monoxide and moisture. Additionally, a substantial amount of hydrogen was produced in the heating and cooling zones by the reaction of residual oxygen and natural gas, as shown in Table 1. The presence of substantial amounts of carbon monoxide and hydrogen or the presence of high pCO/pCO2 (>2.4) and pH2/pH20 (>1.6) ratios both in the heating and cooling zones resulted in reducing the surface of the samples.

The above examples show that non-cryogenically generated nitrogen containing 0.5% residual oxygen or more cannot be used to bright anneal carbon steels using temperatures below about 1,050° C. They also show that a higher purity of non-cryogenically generated nitrogen (>99.7%) and higher amount of natural gas are required to bright anneal carbon steels below about 1,000° C.

Table 2 and the following text set forth a series of heat treating experiments according to the present invention.

TABLE 2

|  | Example 2A | Example 2B | Example 2C | Example 2D |
|---|---|---|---|---|
| Type of Samples | Carbon Steel | Carbon Steel | Carbon Steel | Carbon Steel |
| Heat Treatment Temperature, °C. | 1,050 | 950 | 900 | 850 |
| Flow Rate of Feed Gas, SCFH | 350 | 350 | 350 | 350 |
| Feed Gas Location | Heating Zone | Heating Zone | Heating Zone | Heating Zone |
| Type of Feed Device | Modified Diffuser | Modified Diffuser | Modified Diffuser | Modified Diffuser |
| Feed Gas Composition |  |  |  |  |
| Nitrogen, % | 99.50 | 99.50 | 99.50 | 99.50 |
| Oxygen, % | 0.50 | 0.50 | 0.50 | 0.50 |
| Moisture*, % | 1.00 | 1.00 | 1.00 | 1.00 |
| Natural Gas*, % | 2.00 | 2.00 | 2.00 | 2.00 |
| Heating Zone Atmosphere Composition |  |  |  |  |
| Oxygen, ppm | <3 | <3 | <3 | <5 |
| Hydrogen, % | 5.30 | 4.80 | 4.20 | 3.30 |
| Moisture, ppm | 376 | 850 | 1,500 | 3,600 |
| Carbon Monoxide, % | 1.80 | 1.60 | 1.40 | 1.10 |
| Carbon Dioxide, % | 0.02 | 0.04 | 0.05 | 0.14 |
| Cooling Zone Atmosphere Composition |  |  |  |  |
| Oxygen, ppm | <3 | <3 | <6 | ~14 |
| Hydrogen, % | 5.10 | 4.50 | 4.20 | 3.30 |
| Moisture, ppm | 850 | 1,000 | 1,500 | 4,300 |
| Carbon Monoxide, % | 1.70 | 1.50 | 1.40 | 1.10 |
| Carbon Dioxide, % | 0.04 | 0.05 | 0.07 | 0.13 |
| Quality of Heat Treated Samples | Uniform Bright | Uniform Bright | Uniform Bright | Bright with Straw Color |

|  | Example 3A | Example 3B | Example 3C |
|---|---|---|---|
| Type of Samples | Carbon Steel | Carbon Steel | Carbon Steel |
| Heat Treatment Temperature, °C. | 1,050 | 950 | 900 |
| Flow Rate of Feed Gas, SCFH | 350 | 350 | 350 |
| Feed Gas Location | Heating Zone | Heating Zone | Heating Zone |
| Type of Feed Device | Modified Diffuser | Modified Diffuser | Modified Diffuser |
| Feed Gas Composition |  |  |  |
| Nitrogen, % | 99.50 | 99.50 | 99.50 |
| Oxygen, % | 0.50 | 0.50 | 0.50 |
| Moisture*, % | 1.00 | 1.00 | 1.00 |
| Natural Gas*, % | 1.50 | 1.50 | 1.50 |
| Heating Zone Atmosphere Composition |  |  |  |
| Oxygen, ppm | <2 | <4 | <5 |
| Hydrogen, % | 3.30 | 3.15 | 3.00 |
| Moisture, ppm | 4,300 | 5,100 | 7,000 |
| Carbon Monoxide, % | 1.10 | 1.05 | 1.00 |
| Carbon Dioxide, % | 0.09 | 0.14 | 0.19 |
| Cooling Zone Atmosphere Composition |  |  |  |
| Oxygen, ppm | <3 | <3 | ~12 |
| Hydrogen, % | 3.30 | 3.15 | 3.00 |
| Moisture, ppm | 4,300 | 5,100 | 7,000 |
| Carbon Monoxide, % | 1.10 | 1.05 | 1.00 |
| Carbon Dioxide, % | 0.13 | 0.16 | 0.19 |
| Quality of Heat Treated Samples | Uniform Bright | Uniform Bright | Bright with Straw Color |

TABLE 2-continued

|  | Example 4A | Example 4B | Example 4C |
|---|---|---|---|
| Type of Samples | Carbon Steel | Carbon Steel | Carbon Steel |
| Heat Treatment Temperature, °C. | 1,050 | 850 | 750 |
| Flow Rate of Feed Gas, SCFH | 350 | 350 | 350 |
| Feed Gas Location | Heating Zone | Heating Zone | Heating Zone |
| Type of Feed Device | Modified Diffuser | Modified Diffuser | Modified Diffuser |
| Feed Gas Composition | | | |
| Nitrogen, % | 99.50 | 99.50 | 99.50 |
| Oxygen, % | 0.50 | 0.50 | 0.50 |
| Moisture*, % | 1.00 | 1.00 | 1.00 |
| Natural Gas*, % | 1.00 | 1.00 | 1.00 |
| Heating Zone Atmosphere Composition | | | |
| Oxygen, ppm | <2 | <8 | ~140 |
| Hydrogen, % | 1.90 | 1.05 | 0.15 |
| Moisture, ppm | 10,500 | 13,500 | 16,000 |
| Carbon Monoxide, % | 0.65 | 0.35 | 0.05 |
| Carbon Dioxide, % | 0.18 | 0.25 | 0.25 |
| Cooling Zone Atmosphere Composition | | | |
| Oxygen, ppm | <2 | ~25 | ~300 |
| Hydrogen, % | 1.90 | 1.05 | 0.15 |
| Moisture, ppm | 10,500 | 13,500 | 16,000 |
| Carbon Monoxide, % | 0.65 | 0.35 | 0.05 |
| Carbon Dioxide, % | 0.18 | 0.25 | 0.25 |
| Quality of Heat Treated Samples | Bright with Straw Color | Uniform Tightly Packed Gray Oxide | Heavy Gray Oxide with Scale |

|  | Example 5A | Example 5B | Example 5C | Example 5D |
|---|---|---|---|---|
| Type of Samples | Carbon Steel | Carbon Steel | Carbon Steel | Carbon Steel |
| Heat Treatment Temperature, °C. | 1,050 | 950 | 850 | 750 |
| Flow Rate of Feed Gas, SCFH | 350 | 350 | 350 | 350 |
| Feed Gas Location | Heating Zone | Heating Zone | Heating Zone | Heating Zone |
| Type of Feed Device | Modified Diffuser | Modified Diffuser | Modified Diffuser | Modified Diffuser |
| Feed Gas Composition | | | | |
| Nitrogen, % | 99.50 | 99.50 | 99.50 | 99.50 |
| Oxygen, % | 0.50 | 0.50 | 0.50 | 0.50 |
| Moisture*, % | 1.00 | 1.00 | 1.00 | 1.00 |
| Natural Gas*, % | 0.50 | 0.50 | 0.50 | 0.50 |
| Heating Zone Atmosphere Composition | | | | |
| Oxygen, ppm | <9 | <9 | ~150 | ~3,500 |
| Hydrogen, % | 1.00 | 0.15 | 0.00 | 0.00 |
| Moisture, ppm | 15,500 | 18,000 | 18,000 | 15,500 |
| Carbon Monoxide, % | 0.25 | 0.05 | 0.00 | 0.00 |
| Carbon Dioxide, % | 0.25 | 0.25 | 0.25 | 0.09 |
| Cooling Zone Atmosphere Composition | | | | |
| Oxygen, ppm | <4 | ~18 | ~450 | ~3,200 |
| Hydrogen, % | 1.00 | 0.15 | 0.00 | 0.00 |
| Moisture, ppm | 15,500 | 18,000 | 18,000 | 15,000 |
| Carbon Monoxide, % | 0.25 | 0.05 | 0.00 | 0.00 |
| Carbon Dioxide, % | 0.25 | 0.25 | 0.25 | 0.09 |
| Quality of Heat Treated Samples | Uniform Tightly Packed Gray Oxide | Uniform Tightly Packed Gray Oxide | Uniform Tightly Packed Gray Oxide | Heavy gray Oxide with Scale |

*Moisture and natural gas were added as percent of feed noncryogenically generated nitrogen

EXAMPLE 2A

The carbon steel annealing experiment described in Control Example 1A was repeated using the same furnace, flow rate of and composition of non-cryogenically generated nitrogen, and the amount of natural gas added with the exception of using a 1,050° C. annealing temperature (see Table 2). The amount of natural gas was eight (8) times the stoichiometric amount required for the complete conversion of residual oxygen present in the feed nitrogen to a mixture of carbon dioxide and moisture. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly bright surface finish. The residual oxygen present in the feed nitrogen was converted almost completely (less than 3 ppm) in the heating and cooling zones with the natural gas to a mixture of carbon monoxide, carbon dioxide, and moisture. A part of moisture (both produced and added from the outside source) was also reacted with the natural gas to produce a mixture of carbon monoxide and carbon dioxide. Additionally, a substantial amount of hydrogen was produced in the heating and cooling zones by the reaction of residual oxygen and moisture with the natural gas, as shown in Table 2. The presence of substantial amounts of carbon monoxide and hydrogen or the presence of high pCO/pCO2 (>2.6) and pH2/pH20 (>1.4) ratios both in the heating and cooling zones resulted in a reducing atmosphere at the surface of the samples.

This example shows that non-cryogenically generated nitrogen containing 0.5% residual oxygen and that has been humidified with 1% moisture, premixed with eight (8) times the stoichiometric amount of natural gas required for the complete conversion of residual oxygen present in the feed nitrogen to a mixture of carbon dioxide and moisture, and introduced into a heating zone of a furnace through a diffuser will produce in-situ atmosphere suitable for bright annealing carbon steels at 1,050° C.

EXAMPLE 2B

The carbon steel annealing experiment described in Example 2A was repeated using similar furnace, flow rate of and composition of feed gas, and the amount of natural gas with the exception of using 950° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly bright surface finish. The residual oxygen present in the feed nitrogen was converted almost completely (less than 3 ppm) in the heating and cooling zones of the furnace, as shown in Table 2. The presence of substantial amounts of carbon monoxide and hydrogen or the presence of high $pCO/pCO2$ (>2.4) and $pH2/pH2O$ (>1.6) ratios both in the heating and cooling zones resulted in a reducing atmosphere present at the surface of the samples.

This example shows that non-cryogenically generated nitrogen containing 0.5% residual oxygen and that has been humidified with 1% moisture, premixed with eight (8) times the stoichiometric amount of natural gas required for the complete conversion of residual oxygen present in the feed nitrogen to a mixture of carbon dioxide and moisture, and introduced into a heating zone of a furnace through a diffuser can be used to produce in-situ atmosphere suitable for bright annealing carbon steels at 950° C. This example also shows that it is possible to use non-cryogenically generated nitrogen containing 0.5% residual oxygen or more for bright annealing carbon steels at temperatures below about 1,000° C. by humidifying it. This is an unexpected and significant finding.

EXAMPLE 2C

The carbon steel annealing experiment described in Example 2A was repeated using similar furnace, flow rate of and composition of feed gas, and the amount of natural gas with the exception of using 900° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly bright surface finish. The residual oxygen present in the feed nitrogen was converted almost completely (less than 6 ppm) in the heating and cooling zones of the furnace, as shown in Table 2. The presence of substantial amounts of carbon monoxide and hydrogen or the presence of high $pCO/pCO2$ (>2.3) and $pH2/pH2O$ (>1.7) ratios both in the heating and cooling zones resulted in reducing the surface of the samples.

This example shows that non-cryogenically generated nitrogen containing 0.5% residual oxygen and that has been humidified with lo-o moisture, premixed with eight (8) times the stoichiometric amount of natural gas required for the complete conversion of residual oxygen present in the feed nitrogen to a mixture of carbon dioxide and moisture, and introduced into a heating zone of a furnace through a diffuser can be used to produce in-situ atmosphere suitable for bright annealing carbon steels at 900° C. This also example shows that it is possible to use non-cryogenically generated nitrogen containing 0.5% residual oxygen or more for bright annealing carbon steels at temperatures below about 1,000° C. by humidifying it. This is an unexpected and significant finding.

EXAMPLE 2D

The carbon steel annealing experiment described in Example 2A was repeated using similar furnace, flow rate of and composition of feed gas, and the amount of natural gas with the exception of using 850° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have a bright and unacceptable straw color surface finish due to the presence of more than 10 ppm of oxygen in the cooling zone, as shown in Table 2.

This example shows that non-cryogenically generated nitrogen containing 0.5% residual oxygen and that has been humidified with 1% moisture, pre-mixed with eight (8) times the stoichiometric amount of natural gas required for the complete conversion of residual oxygen present in the feed nitrogen to a mixture of carbon dioxide and moisture, and introduced into a heating zone of a furnace through a diffuser cannot be used to produce in-situ atmosphere suitable for bright annealing carbon steels below about 900° C. It may, however, be possible to produce suitable atmosphere by using higher purity of non-cryogenically generated nitrogen and/or higher amount of natural gas.

EXAMPLE 3A

The carbon steel annealing experiment described in Example 2A was repeated using similar furnace, flow rate of and composition of non-cryogenically generated nitrogen, and furnace temperature with the exception of adding 1.5% natural gas instead of 2% (see Table 2). The amount of natural gas was six (6) times the stoichiometric amount required for the complete conversion of residual oxygen present in the feed nitrogen to a mixture of carbon dioxide and moisture. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly bright surface finish. The residual oxygen present in the feed nitrogen was converted almost completely (less than 3 ppm) in the heating and cooling zones with the natural gas to a mixture of carbon monoxide, carbon dioxide, and moisture. The presence of substantial amounts of carbon monoxide and hydrogen or the presence of high $pCO/pCO2$ (>2.6) and $pH2/pH2O$ (>1.4) ratios both in the heating and cooling zones resulted in reducing the surface of the samples.

This example shows that non-cryogenically generated nitrogen containing 0.5% residual oxygen and that has been humidified with 1% moisture, premixed with six (6) times the stoichiometric amount of natural gas required for the complete conversion of residual oxygen present in the feed nitrogen to a mixture of carbon dioxide and moisture, and introduced into a heating zone of a furnace through a diffuser will produce in-situ atmosphere suitable for bright annealing carbon steels at 1,050° C.

EXAMPLE 3B

The carbon steel annealing experiment described in Example 3A was repeated using similar furnace, flow rate of and composition of feed gas, and the amount of natural gas with the exception of using 950° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly bright surface finish. The residual oxygen present in the feed nitrogen was converted almost completely (less than 4 ppm) in the heating and cooling zones of the furnace, as shown in Table 2. The presence of substantial amounts of carbon monoxide and hydrogen or the presence of high $pCO/pCO_2$ (>2.4) and $pH_2/pH_2O$ (>1.6) ratios both in the heating and cooling zones resulted in reducing the surface of the samples.

This example shows that non-cryogenically generated nitrogen containing 0.5% residual oxygen and that has been humidified with 1% moisture, premixed with six (6) times the stoichiometric amount of natural gas required for the complete conversion of residual oxygen present in the feed nitrogen to a mixture of carbon dioxide and moisture, and introduced into a heating zone of a furnace through a diffuser can be used to produce in-situ atmosphere suitable for bright annealing carbon steels at 950° C. This example also shows that it is possible to use non-cryogenically generated nitrogen containing 0.5% residual oxygen or more for bright annealing carbon steels at temperatures below about 1,000° C. by humidifying it. This is, once again, an unexpected and significant finding.

EXAMPLE 3C

The carbon steel annealing experiment described in Example 3A was repeated using similar furnace, flow rate of and composition of feed gas, and the amount of natural gas with the exception of using 900° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have bright and unacceptable straw color surface finish due to the presence of more than 10 ppm of oxygen in the cooling zone, as shown in Table 2. This example shows that higher than 6 times the stoichiometric amount of natural gas is required for producing suitable atmosphere for bright annealing carbon steels from non-cryogenically generated nitrogen containing 0.5% residual oxygen (compare results of Example 2C to Example 3C).

EXAMPLE 4A

The carbon steel annealing experiment described in Example 2A was repeated using similar furnace, flow rate of and composition of non-cryogenically generated nitrogen, and furnace temperature with the exception of adding 1.0% natural gas instead of 2% (see Table 2). The amount of natural gas was four (4) times the stoichiometric amount required for the complete conversion of residual oxygen present in the feed nitrogen completely to a mixture of carbon dioxide and moisture. The non-cryogenically generated nitrogen gas was humidified with 1.0% moisture prior to introducing it into the heating zone of the furnace through the diffuser described in Control Example 1A.

Steel samples heat treated in accord with this procedure were found to have bright and unacceptable straw color surface finish due to high level of moisture in the cooling zone, as shown in Table 2. This example therefore shows that more than four (4) times the stoichiometric amount of natural gas is required to produce atmosphere suitable for bright annealing carbon steels from non-cryogenically generated nitrogen containing 0.5% residual oxygen at 1,050° C. temperature.

EXAMPLE 4B

The carbon steel annealing experiment described in Example 4A was repeated using similar furnace, flow rate of and composition of feed gas, and the amount of natural gas with the exception of using 850° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly tightly packed gray oxide surface finish. This example therefore shows that non-cryogenically generated nitrogen containing 0.5% residual oxygen and that has been humidified with 1% moisture, pre-mixed with four (4) times the stoichiometric amount of natural gas required for the complete conversion of residual oxygen present in the feed nitrogen to a mixture of carbon dioxide and moisture, and introduced into a heating zone of a furnace through a diffuser can be used to produce in-situ atmosphere suitable for oxide annealing carbon steels at about 850° C. This is significant and unexpected finding.

EXAMPLE 4C

The carbon steel annealing experiment described in Example 4A was repeated using similar furnace, flow rate of and composition of feed gas, and the amount of natural gas with the exception of using 750° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to be scaled due to unacceptably high levels of oxygen and moisture in the furnace (see Table 2). This example shows that a temperature close to 750° C. cannot be used to produce atmosphere suitable for oxide annealing from non-cryogenically generated nitrogen.

EXAMPLE 5A

The carbon steel annealing experiment described in Example 2A was repeated using similar furnace, flow rate of and composition of non-cryogenically generated nitrogen, and furnace temperature with the exception of adding 0.5% natural gas instead of 2% (see Table 2). The amount of natural gas was two (2) times the stoichiometric amount required for the complete conversion of residual oxygen present in the feed nitrogen completely to a mixture of carbon dioxide and moisture. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly tightly packed oxide surface finish, as shown in Table 2. This example shows that close to two times the stoichiometric amount of natural gas can be used to produce suitable atmosphere for oxide annealing carbon steels at 1,050° C. from humidified non-cryogenically generated nitrogen containing 0.5% residual oxygen.

EXAMPLE 5B

The carbon steel annealing experiment described in Example 5A was repeated using similar furnace, flow rate of and composition of feed gas, and the amount of natural gas with the exception of using 950° C. temperature, as shown in Table 2. The non-cryogenically generated nitrogen gas was humidified with 1.00-o moisture prior to introducing it into the heating zone of the furnace through the diffuser described in Control Example 1A.

Steel samples heat treated in accord with this procedure were found to have uniformly tightly packed gray oxide surface finish. This example therefore shows that non-cryogenically generated nitrogen containing 0.5% residual oxygen and that has been humidified, premixed with close to two times the stoichiometric amount of natural gas, and introduced into a heating zone of a furnace through a diffuser can be used to produce in-situ atmosphere suitable for oxide annealing carbon steels at 950° C.

EXAMPLE 5C

The carbon steel annealing experiment described in Example 5A was repeated using similar furnace, flow rate of and composition of feed gas, and the amount of natural gas with the exception of using 850° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly tightly packed gray oxide surface finish. This example therefore shows that non-cryogenically generated nitrogen containing 0.5% residual oxygen and that has been humidified, premixed with close to two times the stoichiometric amount of natural gas, and introduced into a heating zone of a furnace through a diffuser can be used to produce in-situ atmosphere suitable for oxide annealing carbon steels at 850° C.

EXAMPLE 5D

The carbon steel annealing experiment described in Example 5A was repeated using similar furnace, flow rate of and composition of feed gas, and the amount of natural gas with the exception of using 750° C. temperature, as shown in Table 2. The non-cryogenically generated nitrogen gas was humidified with 1.0% moisture prior to introducing it into the heating zone of the furnace through the diffuser described in Control Example 1A.

Steel samples heat treated in accord with this procedure were found to be scaled due to unacceptably high levels of oxygen and moisture in the furnace (see Table 2). This example shows that a temperature close to 750° C. cannot be used to produce atmosphere suitable for oxide annealing from non-cryogenically generated nitrogen.

EXAMPLE 6A

The carbon steel annealing experiment described in Example 5B was repeated using similar furnace, flow rate of and composition of feed gas, and heat treating temperature with the exception of using 0.25% natural gas instead of 0.5%. The non-cryogenically generated nitrogen gas was humidified with 1.0% moisture prior to introducing it into the heating zone of the furnace through the diffuser described in Control Example 1A.

Steel samples heat treated in accord with this procedure were found to have uniformly tightly packed gray oxide surface finish. This example therefore shows that non-cryogenically generated nitrogen containing 0.5% residual oxygen and that has been humidified, premixed with stoichiometric amount of natural gas, and introduced into a heating zone of a furnace through a diffuser can be used to produce in-situ atmosphere suitable for oxide annealing carbon steels at 950° C.

The above examples show that atmosphere suitable for bright annealing carbon steels can be produced in-situ from non-cryogenically generated nitrogen at furnace operating temperatures as low as 900° C. by using greater than or equal to eight (8) times the stoichiometric amount of natural gas required for converting residual oxygen to a mixture of carbon dioxide and moisture by humidifying the feed gas with 1% moisture. The amount of natural gas or a hydrocarbon gas required for bright annealing however decreases with an increase in the furnace operating temperature. The above examples also show that atmosphere suitable for oxide annealing carbon steels can be produced in-situ from non-cryogenically generated nitrogen at furnace operating temperatures above about 800° C. by using lower than or equal to four (4) times the stoichiometric amount of natural gas required for converting residual oxygen to a mixture of carbon dioxide and moisture by humidifying the feed gas with 1% moisture. It is important to note that the amount of natural gas required for bright or oxide annealing will change depending upon the level of moisture introduced into the furnace with the feed gas or introduced directly into the furnace. It is also important to note that the amount of hydrocarbon gas, residual oxygen in feed nitrogen, and moisture in the feed gas need to be adjusted in such a way that the desired $pH_2/pH_2O$ and $pCO/pCO_2$ ratios are obtained in the heating and cooling zones of the furnace for bright and oxide annealing, brazing, and sintering operations. Finally, the above examples show that a temperature lower than or equal to 750° C. cannot be used to bright or oxide anneal carbon steels using non-cryogenically generated nitrogen.

Having thus described our invention what is desired to be secured by Letters Patent of the United States is set forth in the appended claims.

We claim:

1. A process for producing a nitrogen-based atmosphere inside a furnace for oxide annealing carbon steels comprising the steps of:
   humidifying non-cryogenically produced nitrogen containing up to 5% by volume residual oxygen;
   mixing said humidified non-cryogenically produced nitrogen with less than four times the amount of a hydrocarbon gas required to convert the residual oxygen to a mixture of carbon dioxide and moisture; and
   feeding said mixture of humidified nitrogen and hydrocarbon gas into the heating zone of the furnace maintained at a temperature above about 750° C. so that said oxygen in said mixture reacts with said hydrocarbon, said reaction being essentially complete prior to said mixture contacting steel in said furnace so that the atmosphere produced in said furnace is oxidizing in nature; and
   controlling $pH_2/pH_2O$ and $pCO/pCO_2$ ratios in the furnace atmosphere to effect oxide annealing.

2. A process according to claim 1 wherein at lest 1% by volume of moisture is added to the non-cryogenically produced nitrogen.

3. A process according to claim 1 wherein the furnace heating zone is heated to a temperature of at least 800° C.

4. A process for producing a nitrogen-based atmosphere inside a furnace for bright annealing carbon steels comprising the steps of:
   humidifying non-cryogenically produced nitrogen containing up to 5% by volume residual oxygen;
   mixing said humidified nitrogen with at least eight times the stoichiometric amount of a hydrocarbon gas required to react with said oxygen to produce dioxide and moisture; and
   feeding said mixture into the heating zone of a furnace at temperatures about 750° C. by directing said humidified nitrogen and hydrocarbon gas away from direct impingement on steel being treated in said furnace to permit reaction of said oxygen and said hydrocarbon before said oxygen can contact said steel being heated in said furnace so that the atmosphere in said furnace is reducing in nature by controlling; and
   controlling $pH_2/pH_2O$ and $pCO/pCO_2$ in the furnace atmosphere to facilitate bright annealing.

5. A process according to claim 4 wherein the heating zone of said furnace is heated to a temperature of at least 900° C.

6. A process according to claim 4 wherein at least 1% by volume moisture is added to said nitrogen.

7. A process according to claim 4 wherein the $pCO/pCO_2$ ratio is greater than 2.6 and the $pH_2/pH_2O$ ratio is greater than 1.4.

8. A process according to claim 4 wherein the furnace has a heating and cooling zone and the $pCO/pCO_2$ ratio is greater than 2.3 and $pH_2/pH_2O$ ratio is greater than 1.7 in both the heating and cooling zones.

* * * * *